(12) United States Patent
Parikh

(10) Patent No.: US 7,161,999 B2
(45) Date of Patent: Jan. 9, 2007

(54) SYNCHRONIZING DATA OR SIGNAL TRANSFER ACROSS CLOCKED LOGIC DOMAINS

(75) Inventor: Rupal Parikh, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 795 days.

(21) Appl. No.: 10/038,956

(22) Filed: Jan. 2, 2002

(65) Prior Publication Data

US 2003/0123588 A1   Jul. 3, 2003

(51) Int. Cl.
  *H04L 7/00* (2006.01)
  *G11C 7/10* (2006.01)
  *H03L 7/00* (2006.01)
(52) U.S. Cl. .................. 375/354; 327/141; 327/144; 375/372; 365/189.01; 365/189.04
(58) Field of Classification Search ................ 375/354, 375/356, 358, 372, 370; 710/52, 3, 5, 33, 710/110, 310; 711/167, 105; 395/307, 566; 370/235, 230, 298, 301; 455/502; 365/189.01, 365/189.12, 189.04, 220; 713/400
See application file for complete search history.

(56) References Cited

U.S. PATENT DOCUMENTS

| | | | | |
|---|---|---|---|---|
| 5,070,443 A | * | 12/1991 | Priem et al. | 710/105 |
| 5,592,685 A | * | 1/1997 | Pawlowski | 710/62 |
| 5,694,588 A | * | 12/1997 | Ohara et al. | 712/225 |
| 5,793,994 A | * | 8/1998 | Mitchell et al. | 710/105 |
| 5,798,546 A | * | 8/1998 | Watsuji et al. | 257/316 |
| 5,905,766 A | * | 5/1999 | Nguyen | 375/354 |
| 6,055,285 A | * | 4/2000 | Alston | 375/372 |
| 6,345,328 B1 | * | 2/2002 | Rozario et al. | 710/52 |
| 6,400,785 B1 | * | 6/2002 | Sunaga et al. | 375/372 |
| 6,405,296 B1 | * | 6/2002 | Barth et al. | 711/167 |
| 6,584,536 B1 | * | 6/2003 | Deng | 710/310 |
| 6,718,449 B1 | * | 4/2004 | Phi | 711/167 |
| 6,748,039 B1 | * | 6/2004 | Bates | 375/354 |
| 6,865,241 B1 | * | 3/2005 | Adkins et al. | 375/372 |
| 6,956,776 B1 | * | 10/2005 | Lowe et al. | 365/189.07 |
| 6,999,542 B1 | * | 2/2006 | Korger et al. | 375/354 |
| 2001/0042219 A1 | * | 11/2001 | Robertson | 713/400 |
| 2002/0023238 A1 | * | 2/2002 | Yamada et al. | 713/400 |

* cited by examiner

*Primary Examiner*—Kevin Kim
*Assistant Examiner*—Linda Wong
(74) *Attorney, Agent, or Firm*—Trop, Pruner & Hu, P.C.

(57) ABSTRACT

A synchronization interface transfers multi-bit digital data or signal between multiple clocked logic domains while maintaining data or signal integrity. When deployed in a processor-based system, in one embodiment, a plurality of data units may be received at a source location in a first clocked domain. To control writing of the plurality of data units from the source location to a target location in a second clocked domain, an enable signal may be detected. This enable signal may be synchronized with respect to the second clocked domain. Finally, in response to the synchronized enable signal, the plurality of data units may be transferred from the first clocked domain to the target location in the second clocked domain. The synchronization interface may comprise a data path to capture the multi-bit digital data or signal based on a control logic implementing a mechanism (e.g., a state machine) to synchronously transfer the data across a first and a second asynchronously clocked domains capable of receiving a first and a second clock, respectively.

27 Claims, 5 Drawing Sheets

SYNCHRONIZING DATA OR SIGNAL TRANSFER ACROSS CLOCKED LOGIC DOMAINS

BACKGROUND

The present invention relates generally to mechanisms for synchronizing data or signal transfer across clocked logic domains, and more particularly, to synchronizing multi-bit digital data or signal transfer between asynchronously clocked logic domains.

Within a single computing system, a number of different components or subsystems may operate at different frequencies. In particular, various components or subsystems utilized for the construction of a computing system may independently operate at different frequencies, such as in microprocessors and micro-controllers, where certain components or subsystems have a faster rate of operation than the operating frequencies of other system components or subsystems. Therefore, typically, it is desirable to devise computing systems with the ability to support multiple domains, which may operate at different frequencies.

For instance, most computing systems typically include a number of electronic circuits referred to as "clocked logic domains" that operate independently based on electrical "timing" or "clock" signals. Such clock signals are used to control and coordinate the activities of the computing system's various components or subsystems. One of the clock signals, the system clock signal, is a reference clock signal to which the various components or subsystems of the computer synchronize their operation. The computing system's components or subsystems generally include device clock synthesizer to generate a device clock signal synchronized to the system clock signal.

A particular device interface, or bus operating at a specific frequency, may define a distinct clocked logic domain. A variety of clocked systems may include one or more clock synthesizers, clock controllers or timers, such as a real time clock generator, an operating system timer, or an analog to digital converter controller that may require synchronizing transfer of multiple bits of data between asynchronous clock domains. However, synchronization of data transfer, particularly between various clocked logic domains presents a number of problems.

While transferring digital data or signals between multiple clocked logic domains in a clocked system, one problem involves synchronization, such as by using storage elements or other hardware so that the timing of the digital data or signals transmitted is properly aligned at the receiving end. In doing so, the data or signals being transferred from one clocked logic domain may be delayed by one or more clock cycles so that the data or signals may be synchronized with the clock signals in another clocked logic domain, as an example. However, providing such synchronization may cause undesirable and sometimes unpredictable delays in the communications path or the data path. This may result in significant performance degradation and/or lack of data or signal integrity.

Using a single bit synchronizer each bit of the multi-bit digital data or signal may be individually synchronized. However, there is a significantly high probability of transmission of an incorrect value across clock domains. Therefore, a clocked system may not be maintained fully synchronous because of the erroneous nature of the data transfer. In addition, a single bit synchronizers based scheme may impose restriction on updating the data in the source clock domain so that data is not corrupted during transfer.

Unfortunately, such single bit synchronization arrangement or mechanism may employ the same number of one-bit synchronizers as the number of bits in the multi-bit digital data or signal. For example, circuitry including at least 32 one-bit synchronizers may be generally required to send 32-bit data, consuming a significant amount of hardware and real estate. For situations where one clock may be removed on a temporary basis, maintaining adequate data or signal integrity while performing synchronization on a bit-by-bit basis, a synchronized data transfer may be even more difficult. Consequently, such an arrangement, or mechanism may be inadequate or inefficient for synchronizing multi-bit digital data or signal. Accordingly, these techniques may be unable to appropriately synchronize the transfer of multi-bit digital data or signal across multiple independently clocked logic domains while maintaining sufficient data or signal integrity. Thus, a technique is desired for transferring multi-bit digital data or signal between multiple clocked logic domains that reduces or addresses these problems.

Therefore, it is desirable to synchronously transfer multi-bit digital data or signal across multiple clocked domains.

DETAILED DESCRIPTION

Figure 1:
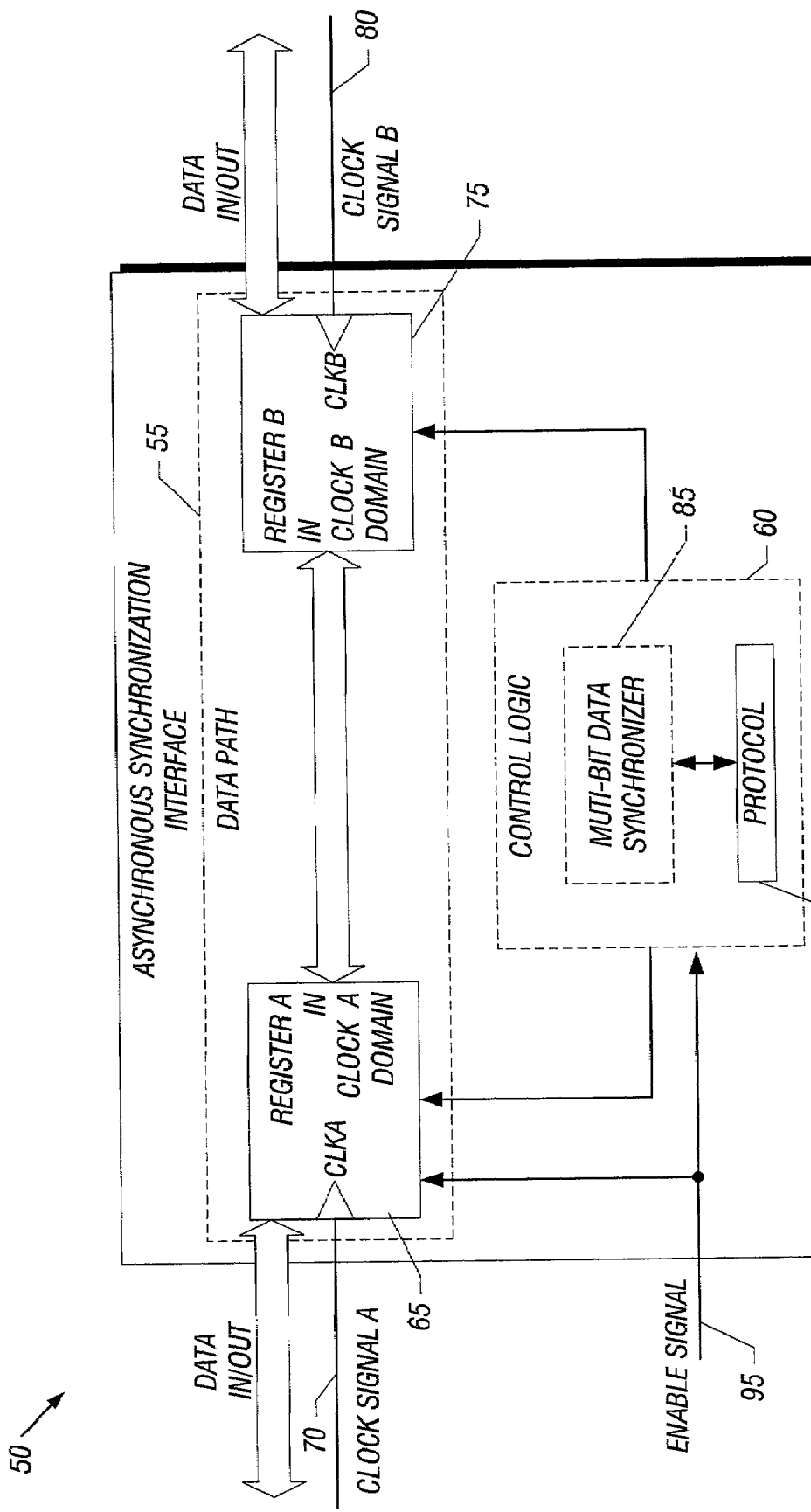
FIG. 1 is a block diagram of an asynchronous synchronization interface that may be employed in a synchronous system including multiple asynchronous clocked logic domains, in accordance with one embodiment of the present invention.

A synchronization interface 50 as shown in FIG. 1 includes, in one embodiment, a data path 55 (e.g., a bus interface) coupled to a control logic 60. Instead of a single bit synchronization where each bit of the digital data or signal (e.g., multi-bit digital data or signal) is synchronized individually, the synchronization interface 50 may collectively synchronize multi-bit digital data or signal for transferring across multiple clock domains over the data path 55. For a synchronous transfer of the multi-bit digital data or signal in one embodiment, the control logic 60 may operate one or more storage elements (e.g., registers) in a clock A domain logic block 65 capable of receiving a clock signal A 70 and at least one another storage element (e.g., a register) located in a clock B domain logic block 75 capable of receiving a clock signal B 80.

In one case, the control logic 60 further comprises a multi-bit data synchronizer 85 and a protocol 90 to controllably execute the multi-bit data synchronizer 85, providing asynchronous synchronization between the clock A and the clock B domain logic blocks 65, 75 which may be independently or asynchronously clocked, as an example. Additionally, in one embodiment, the multi-bit data synchronizer 85 may comprise one or more registers where each register may include one or more latches or flip-flops to hold and/or store the multi-bit digital data or signal associated with the particular data transfer. Alternatively, in another embodiment, the multi-bit data synchronizer 85 may incorporate back to back registers instead of using a single register to substantially avoid reaching quasi-stable states while in operation.

As described below, while transferring the multi-bit digital data or signal between the clock A domain logic block 65 and the clock B domain logic block 75 over the data path 55, a relatively high level of data or signal integrity for such multi-bit digital data or signal transfer may be provided. Consistent with one embodiment of the synchronization interface 50, before undertaking a particular data transfer, an enable signal 95 may be received at the control logic 60 to initiate synchronization of the multi-bit digital data or signal. Moreover, the enable signal 95 may also controllably operate the clock A domain logic block 65.

However, regardless of a specific implementation of the synchronization interface 50, many processor-based systems including a wireless phone, computer, personal digital assistant (PDA), pager, portable music player, or any other device capable of receiving information over one or more communication links, such as wireline or wireless links, may be suitably synchronized. In one embodiment, for example, a clocked system may be a readily transportable device, such as a hand-held device, which may include a microprocessor, such as a digital signal processor or a mobile wireless processor.

Likewise, the synchronization interface 50 may be any electronic device, that can be readily designed and fabricated via a variety of known electronic design automation (EDA) tools including, but is not limited to, simulation and fabrication tools, such as very high speed IC (VHSIC) Hardware Description Language (VHDL) based on Institute of Electrical and Electronics (IEEE) Standards 1076-1987 and 1076-1993 both available from The IEEE, Inc., IEEE Customer Service 445 Hoes Lane, PO Box 1331 Piscataway, N.J. 08855-1331,USA.

For instance, the synchronization interface 50 may be a semiconductor device, which may be deployed in a clocked system to generally provide robust, i.e., synchronized data transfer within a time period that may be a predefined or fixed time period such as, a bus cycle associated with a bus interface. According to one embodiment of the present invention, as shown in FIG. 1, the synchronization interface 50 may employ the data path 55 coupleable between a first and a second clocked domain, i.e., the clock A domain logic block 65 and the clock B domain logic block 75. For receiving a plurality of data units at a source location in the first clocked domain, the control logic 60 may be operably coupled to the data path 55.

To control writing of the plurality of data units from the source location to a target location in the second clocked domain, the control logic 60 may detect the enable signal 95 at the first clocked domain. Here, the source location may be included in a first clocked logic domain, i.e., in the clock A domain logic block 65 and the target location may be included in a second clocked logic domain, i.e., in the clock B domain logic block 75.

One operation for synchronizing the multi-bit digital data or signal across clocked multiple domains involves using the protocol 90 to transfer multi-bit digital data or signal, via a state machine, for example. However, the scope of the invention is not so limited. Of course, other arrangements such as any suitable hardware may be readily deployed for recording such information pertaining to the synchronization of the multi-bit digital data or signal. In one case, using the protocol 90, the control logic 60 may first synchronize the enable signal 95 with respect to the second clocked domain. When the enable signal 95 is appropriately synchronized, the plurality of data units may be transferred from the first clocked domain to the target location in the second clocked domain.

Based on the enable signal 95, a first signal indicating arrival of the plurality of data units of the multi-bit digital data or signal at the source location may be provided to the first clocked domain. Responsive to the first signal, data transfer of the plurality of data units to the target location in the second clocked domain may be initialized. Upon the initialization of the data transfer, a second signal indicating synchronization of the enable signal 95 with respect to the second clocked domain may be generated. In turn, the data transfer from the source location in the first clocked domain to the target location in the second clocked domain may be initiated.

A third signal indicating transmission of the plurality of data units for the first clocked domain may be generated based on the initialization of the data transfer. For starting a next write cycle, as a response to the third signal, the availability of the second clocked domain may be indicated to the first clocked domain. To indicate transmission of at least one data unit of the plurality of data units and availability of the second clocked domain for a next write cycle, a feedback signal may be provided to the first clocked domain.

In one embodiment, the first signal may be generated in response to a transition from a first state to a second state in a state machine. For the purposes of holding and subsequently transferring multi-bit digital data or signal, a first register and an intermediate register being a shadow copy of the first register may be provided at the source location in the first clocked domain. Likewise, a second register at the target location in the second clocked domain may be provided.

In operation, the plurality of data units may be loaded into the intermediate register from the first register. While asynchronously transferring the plurality of data units between the first and second clocked domains where each domain may include at least one independently clocked logic with respect to another clocked logic, switching of a clocking signal may be appropriately handled based on the state machine. The multi-bit data synchronizer 85 may enable an asynchronous data transfer between the first and second clocked domains. In order to drive the multi-bit data synchronizer 85, the protocol 90 may be accordingly implemented to cause the transition between a particular state and another particular state in the state machine.

In particular, according to the protocol 90 in response to the enable signal 95, the state machine may be operated to transition from the first state including an initial state to the second state including a plurality of target states. Furthermore, when at least one particular condition (e.g., a condition may indicate either a completion or non-completion of a write operation) is met, the multi-bit data synchronizer 85 combines the synchronization of the plurality of data units for asynchronous data transfer across the first and second clocked domains. Conversely, if the particular condition is not met, the multi-bit data synchronizer 85 holds the transfer of the plurality of data units.

In one embodiment, the synchronization interface 50 provides mechanisms to reliably perform transfers of multi-bit digital data or signal in a write cycle. Alternatively, such data transfer may be carried out over a plurality of consecutive write cycles, or otherwise of certain duration based on a particular application. As in most electronic systems, such as in clocked systems where multiple clocked domains are present, one or more data units, particularly data bits of the multi-bit digital data or signal may be transferred in a substantially synchronous manner, i.e., in synchronous clocked systems having multiple independently clocked logic domains where a particular clocked logic domain may desire multi-bit digital data or signal transfer. By deploying the synchronization interface 50, such multi-bit digital data or signal may be synchronously transferred together, allowing seamless propagation of data or signals between asynchronous clock domains. Thus, the synchronization interface 50 enables such data or signal propagation between independently operating clock domains at different, asynchronous frequencies which may be non-integer multiples, in one embodiment.

Likewise, in another embodiment, data transfer may be provided when the clock signal A 70 has a first frequency and the clock signal B 70 has a second frequency higher than the first frequency, for example, system and device clock frequencies present in microprocessors generally deployed in a processor-based system. And, more particularly, within hierarchical clock frequency domains for microprocessor core logic functional units, transferring of data and signals may be provided between multiple clocked logic domains (e.g., the clock A, and B domain logic blocks 65 and 75).

Figure 2:
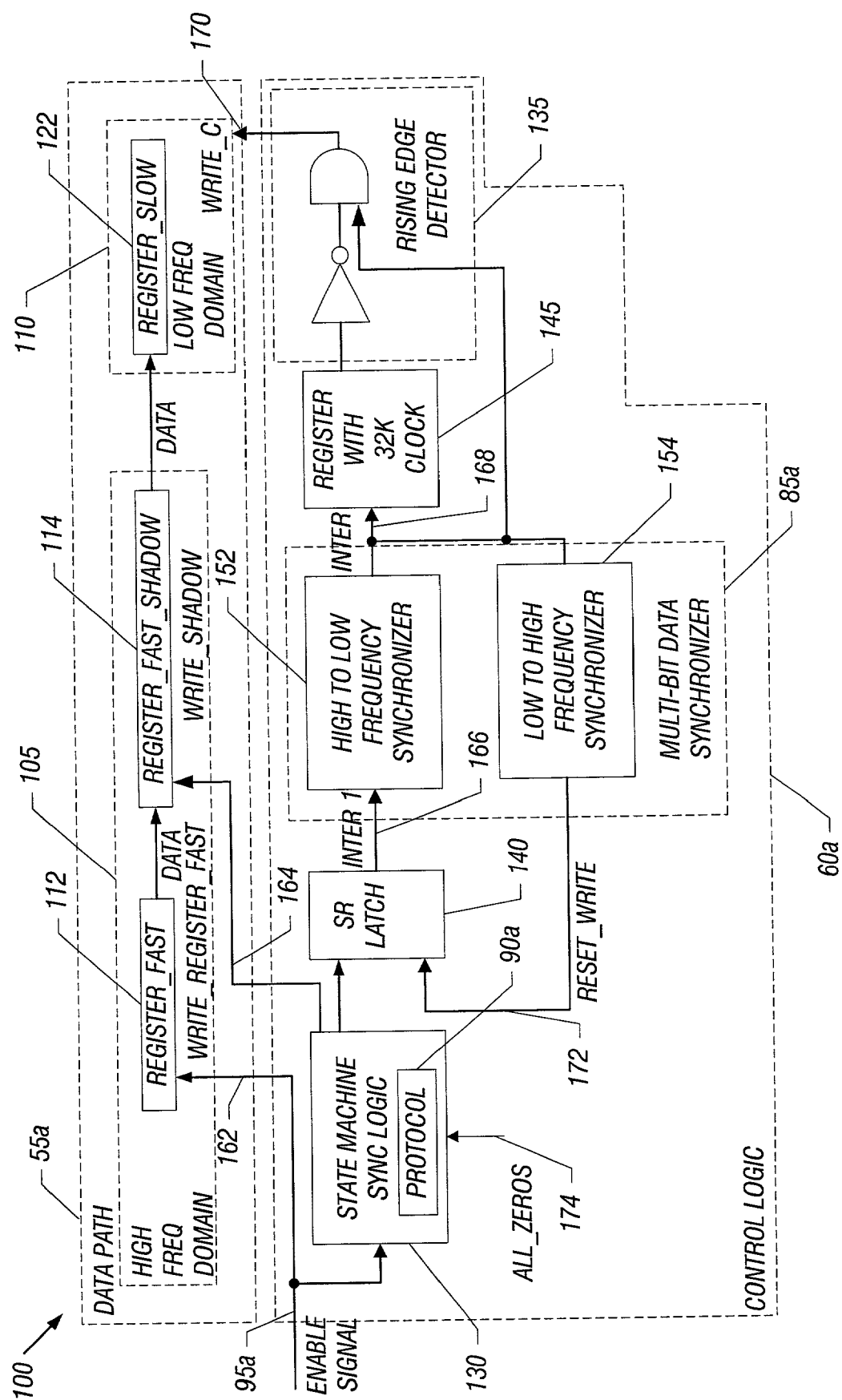
FIG. 2 is a schematic depiction of the asynchronous synchronization interface of FIG. 1 according to one embodiment of the present invention.

For the purposes of transferring multi-bit digital data or signal, an asynchronous synchronization interface 100 shown in FIG. 2 may be employed in a synchronous system comprising multiple asynchronous clocked logic domains (e.g., the clock A and B domain logic blocks 65 and 75 in FIG. 1), in accordance with one embodiment of the present invention. To this end, the asynchronous synchronization interface 100 includes a data path 55a and a control logic 60a.

The data path 55a further encompasses a high frequency domain 105 and a low frequency domain 110. The high frequency domain 105 incorporates a register REGISTER_FAST 112 and a register REGISTER_FAST_SHADOW 114 each clocked by a bus clock (e.g., the clock signal A 70 of FIG. 1). Similarly, the low frequency domain 110 includes a register REGISTER_SLOW 122 clocked by another clock (e.g., the clock signal B 80 of FIG. 1). When the control logic 60a signals the data path 55a, the register REGISTER_SLOW 122 is loaded with the data in the register REGISTER_FAST_SHADOW 114.

The control logic 60a further comprises a state machine SYNC logic 130 including a protocol 90a. The control logic 60a further includes a multi-bit data synchronizer 85a, a rising edge detector 135, a set reset (SR) latch 140, and a lower frequency clocked register 145, for example, clocked at 32 Khz. The rising edge detector 135 detects a rising edge at the output of the lower frequency clocked register 145. The protocol 90a operates the state machine SYNC logic 130, which is discussed later. The multi-bit data synchronizer 85a includes a high to low frequency synchronizer 152 and a low to high frequency synchronizer 154.

Before discussing the operation of this protocol 90a, the description of the control signals is provided in accordance with one embodiment of the present invention. The control signals include a WRITE_REGISTER_FAST signal 162 to determine a write to the register REGISTER_FAST 112 in the high frequency domain 105. In addition, the control signals include a WRITE_SHADOW signal 164 to indicate that the register REGISTER_FAST_SHADOW 114 be loaded with the data in the register REGISTER_FAST 112 of the high frequency domain 105.

In one embodiment, the SR latch 140 provides an INTER 1 signal 166 to the high to low frequency synchronizer 152 and, in turn, the high to low frequency synchronizer 152 outputs an INTER signal 168 to the lower frequency clocked register 145. In turn, the rising edge detector 135 provides a WRITE_C signal 170 that determines or detects the rising edge of the INTER signal 168, which causes a write into the register REGISTER_SLOW 122 of the low frequency domain 110. By advantageously using the rising edge of the INTER signal 168, the data may be entered only once into a clocked system. Examples of such a clocked system include a counter used in a variety of software, hardware, or firmware modules, alone or in combination, such as a real time clock module, an operating system timer, and an analog to digital converter controller.

Moreover, a RESET_WRITE signal 172 may indicate that the write to the counter is performed and the process of resetting the SR latch 140 is being initiated. In response to the RESET_WRITE signal 172, the SR latch 140 may go into the initial state and wait for another write or perform another write. According to one embodiment, a condition signal, such as an ALL_ZEROS condition signal 174 may be derived by combining the INTER 1 signal 166, the INTER signal 168 and the RESET_WRITE signal 172 in a conventional NOR logic. When in a high state, the ALL_ZEROS condition signal 174 indicates that one write is fully performed and the control logic 60a is progressed back to its reset state. With this signal, the protocol 90a may go to the initial state to wait for another write to occur or go to the write state to perform another write in the queue.

Figure 3:
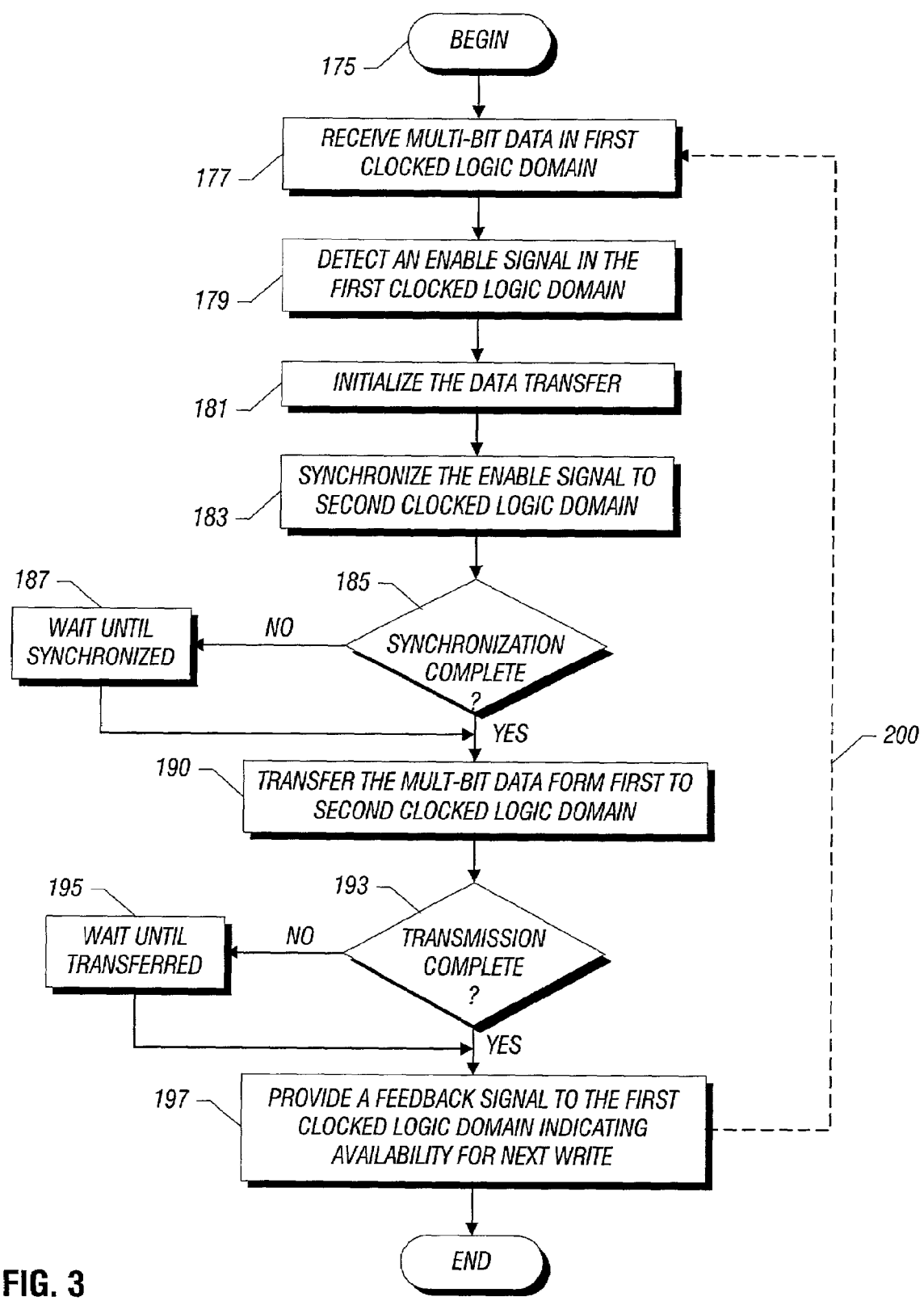
FIG. 3 is a flow chart of a multi-bit data synchronizer mechanism that provides multi-bit digital data or signal transfer between the asynchronously clocked, high and low frequency domains of FIG. 2 in accordance with one embodiment of the present invention.

A multi-bit data synchronizer mechanism 175 shown in FIG. 3 provides multi-bit digital data or signal transfer between the asynchronously clocked, high and low frequency domains 105, 110 of FIG. 2 in accordance with one embodiment of the present invention. In one embodiment, the multi-bit data synchronizer mechanism 175 receives multi-bit digital data or signal in a first clocked logic domain, i.e., in the high frequency domain 105 at block 177. Then, the multi-bit data synchronizer mechanism 175 via the control logic 60a detects (at block 179) whether an enable signal 95a is present. A clocking signal, such as the clock signal A 70 of FIG. 1, intended for transferring data from a source location (i.e., comprising the REGISTER_FAST 112 and REGISTER_FAST_SHADOW 114) in the high frequency domain 105 is provided. And, if that is the case, suitable initialization for the data transfer to another location in the low frequency domain 110 may be indicated in block 181.

Using the control logic 60a and registers REGISTER_FAST 112 and REGISTER_FAST_SHADOW 114, the multi-bit data synchronizer mechanism 175 may synchronize multi-bit digital data or signal for subsequent transferring thereof in a synchronous manner, for example, to the register REGISTER_SLOW 122 at block 183. Thus, a clocked system may be maintained fully synchronous because of the synchronous nature of the data transfer. Accordingly, as shown in FIG. 3, such synchronization arrangement, or mechanism may avoid employing the same number of one-bit synchronizers as the number of bits in multi-bit digital data or signal. For example, instead of using at least 32 one-bit synchronizers to send 32-bit data, a substantially smaller number of synchronizers and registers may be used, saving a significant amount of hardware and real estate.

A check at the diamond 185 indicates whether the synchronization is complete. If incomplete, the multi-bit data synchronizer mechanism 175 proceeds to wait until the enable signal 95a is synchronized to the low frequency domain 110 at block 187. Otherwise, the multi-bit data synchronizer mechanism 175 may synchronously transfer the multi-bit digital data or signal from the first clocked logic domain to the second logic domain, i.e., from the high to low frequency domain 105, 110, at block 190.

Another check at the diamond 193 indicates whether the transmission to the register REGISTER_SLOW 122 is complete. If incomplete, the multi-bit data synchronizer mechanism 175 proceeds to wait until the multi-bit digital data or signal is transferred to the low frequency domain 110 at block 195. Conversely, the low frequency domain 105 may provide a feedback signal indicating completion of the transmission to the high frequency domain 110, at block 197. When another write cycle is desired, the multi-bit data synchronizer mechanism 175 may iterate back to the block 177 as indicated by the dotted arrow 200 in FIG. 3.

Figure 4:
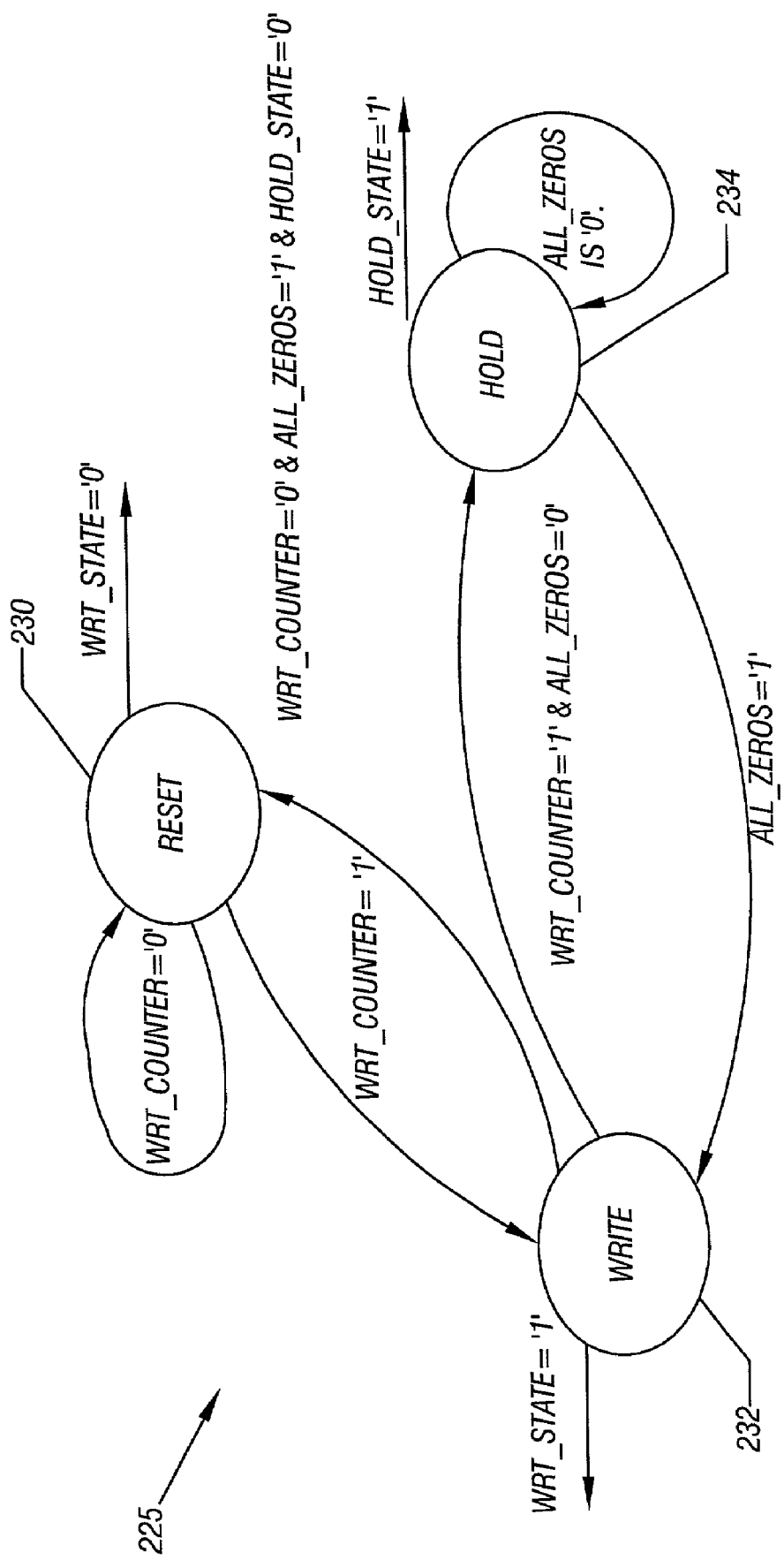
FIG. 4 is a state machine diagram for driving the multi-bit synchronizer logic of FIG. 3 in accordance with one embodiment of the present invention.

In one embodiment, the multi-bit data synchronizer mechanism 175 employs the state machine SYNC logic 130 of FIG. 2 to control synchronization of the multi-bit digital data or signal. For the state machine SYNC logic 130, the default state being derived from a state machine 225 is depicted in FIG. 4 as a RESET state 230. Using an example of a counter toggling between two logic levels, i.e., a high level "WRT_COUNTER=1" and a low level "WRT_COUNTER=0" for one particular embodiment, the state machine SYNC logic 130 may control the counter. Other exemplary state transitions of the state machine 225 are generally illustrated in FIG. 4.

Specifically, this state machine 225 transitions on the rising edge of the fast clock to the high frequency domain 105. If the WRITE_REGISTER_FAST signal 162 is asserted, the state machine 225 transitions to a WRITE state 232. The transition to the WRITE state 232 sets the SR latch 140 in the control logic 60a and also enables loading the data from the register REGISTER_FAST 112 to the register REGISTER_FAST_SHADOW 114. The output of the SR latch 140, i.e., the INTER 1 signal 166 gets asserted and is passed through the high to low frequency synchronizer 152 which comprises two back to back registers clocked by the slower clock to the low frequency domain 110 in one embodiment.

In operation, during the time that data to be written is transferred from the high frequency domain 105 to the low frequency domain 110, should another write occur to the register REGISTER_FAST 112, the state machine 225 transitions to the HOLD state 234. After the ALL_ZEROS condition signal 174 gets asserted, the state machine 225 transitions to the WRITE state 232 from the HOLD state 234 and starts a new transfer of data across the multiple clock domains, e.g., the high and frequency domains 105, 110.

When the output of the high to low frequency synchronizer 152, i.e., the INTER signal 168 transitions from logic levels "0" to "1", the WRITE_C signal 170 is asserted, and data from the register REGISTER_FAST_SHADOW 114 in the fast clock domain, i.e., the high frequency domain 105 is loaded into the register REGISTER_SLOW 122 in the slow clock domain, i.e., the low frequency domain 110. The INTER signal 168 is synchronized to the high frequency domain 105 via a low to high frequency synchronizer 154, which comprises two back to back registers clocked by the fast clock to the high frequency domain 105 in one embodiment.

The output of the low to high frequency synchronizer 154, i.e., the RESET_WRITE signal 172 clears the SR latch 140 at the next rising edge of the fast clock to the high frequency domain 105. When the logic level "0" is propagated to INTER signal 168 and the RESET_WRITE signal 172, the ALL_ZEROS condition signal 174 is asserted. This indicates that the control logic 60a is ready to begin another write data transfer to the low frequency domain 110, if desired.

Figure 5:
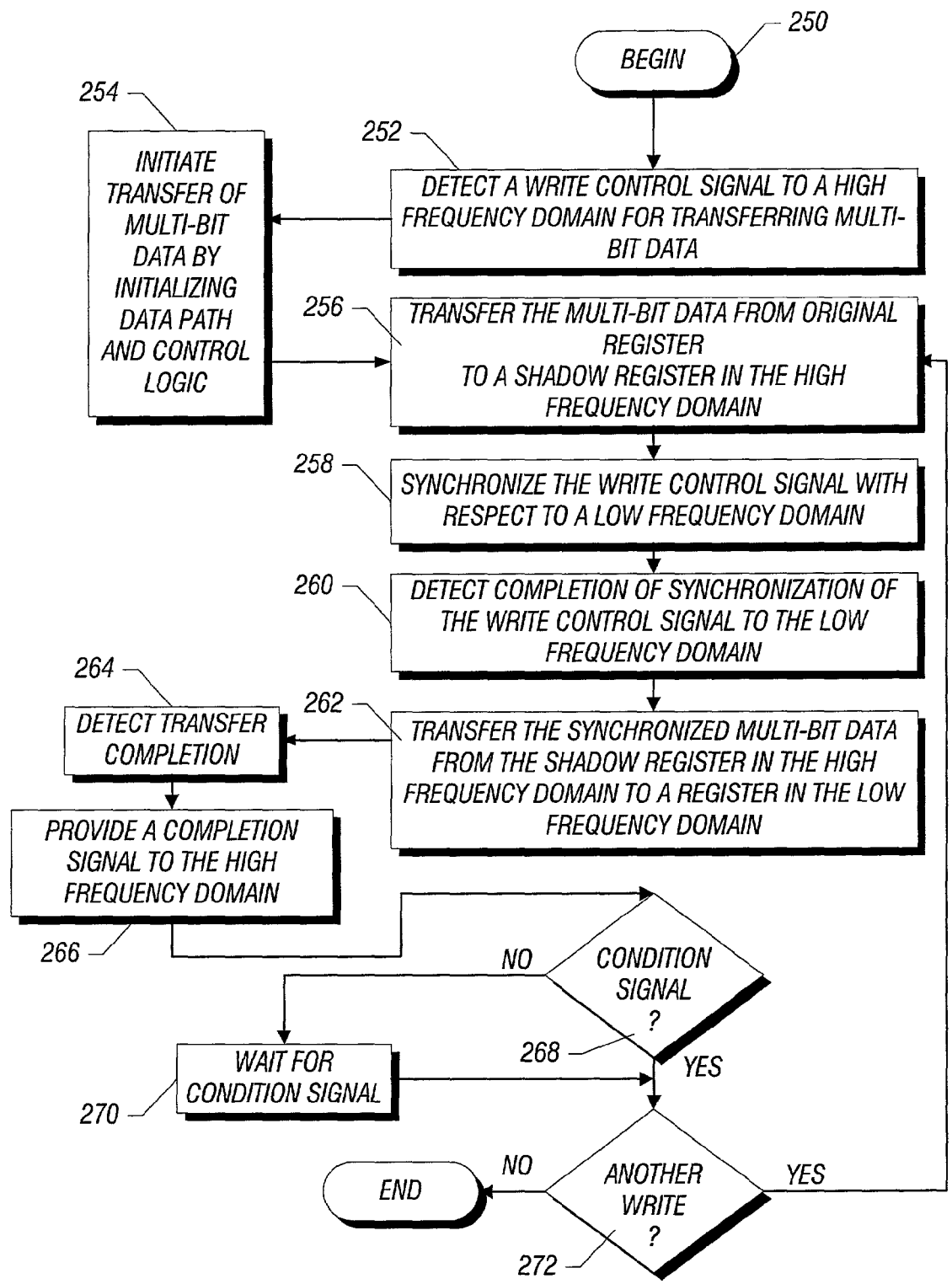
FIG. 5 is a flow chart of an asynchronous synchronization mechanism employing the state machine of FIG. 4 to provide multi-bit synchronized writes across two different frequency domains in accordance with one embodiment of the present invention.

An asynchronous synchronization mechanism 250 shown in FIG. 5 employs the state machine 225 of FIG. 4 to provide multi-bit synchronized writes across two different frequency domains (i.e., the high and frequency domains 105, 110 of FIG. 2) in accordance with one embodiment of the present invention. The asynchronous synchronization mechanism 250 may detect (at block 252), a write control signal to the high frequency domain 105 for transferring multi-bit digital data or signal to the low frequency domain 110, i.e., from the register REGISTER_FAST 112 and the register REGISTER_FAST_SHADOW 114 in the high frequency domain 105 to the register REGISTER_SLOW 122 in the low frequency domain 110. Before transferring the multi-bit digital data or signal at block 254, a suitable initialization for the data transfer may be effectuated by appropriately initializing the data path 55a and the control logic 60a. Using the control logic 60a, the asynchronous synchronization mechanism 250 may transfer the multi-bit digital data or signal from the register REGISTER_FAST 112 to the register REGISTER_FAST_SHADOW 114 in the high frequency domain 110 in block 256. The write control signal may be synchronized with respect to the low frequency domain 105 at block 258.

In response to the enable signal 95a to the high frequency domain 105, completion of the synchronization of the write control signal through the WRITE_C signal 170 to the low frequency domain 110 may be detected at block 260. Accordingly, in block 262, the synchronized multi-bit digital data or signal may be transferred from the register REGISTER_FAST_SHADOW 114 in the high frequency domain 105 to the register REGISTER_SLOW 122 in the low frequency domain 110. Completion of the transfer of the multi-bit digital data or signal may be detected at block 264. Depending on the state of the transfer, a completion signal may be provided to the high frequency domain 105 at block 266.

A check at the diamond 268 indicates whether a condition is fulfilled. If unfulfilled, the asynchronous synchronization mechanism 250 proceeds to wait until the condition signal is provided at block 270. Otherwise, the asynchronous synchronization mechanism 250 may continue writing. Another check at the diamond 272 indicates whether an another write cycle is indicated. If no, the asynchronous synchronization mechanism 250 completes the current session. Conversely, when another write cycle is desired, the asynchronous synchronization mechanism 250 may iterate back to the block 256. Thus, the asynchronous synchronization mechanism 250 acts as the interface to transfer multi-bit digital data or signal from the high frequency domain 105 to the low frequency domain 110, i.e., enables synchronized data transfer from the register REGISTER_FAST 112 in the high frequency domain 105 to the register REGISTER_SLOW 122 in the low frequency domain 110 based on the multi-bit data synchronizer 85a depicted in FIG. 2.

Although there are many similar mechanisms that may perform synchronization, the asynchronous synchronization mechanism 250 is especially appropriate for situations where one clock (e.g., the clock signal A 70 of FIG. 1) may be removed on a temporary basis. Therefore, the asynchronous synchronization mechanism 250 can be practically used anytime there is transfer of multi-bit digital data or signal across multiple clock domains.

While the asynchronous synchronization mechanism 250 can be used for transferring data from either a fast clock domain to a slow clock domain or vice-versa, it may be more useful in transferring data from a fast clock domain to the slow clock domain, especially when the slow clock domain is significantly slower. In the later case, an additional cycle of the slow clock may be allowed to pass before working on the synchronized data to ensure that all the data has transferred between the two clock domains. The slower the clock of the slow domain, the greater the impact of the elapsed time would be. One advantage of the asynchronous synchronization mechanism 250 over the individual synchronizer solutions is that there may be a lower probability of transmission of an incorrect value across clock domains.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving a plurality of data units at a source location in a first clocked domain to be written to a target location in a second clocked domain, having a different clocking frequency than said first domain;
   detecting at said first clocked domain, an enable signal to control writing of said plurality of data units from said source location to a target location in the second clocked domain;
   synchronizing the enable signal with respect to the second clocked domain;
   in response to said synchronized enable signal, transferring said plurality of data units from the first clocked domain to the target location in said second clocked domain;
   providing a first register and an intermediate register being a shadow copy of the first register at the source location in said first clocked domain; and
   providing a second register at said target location in said second clocked domain.

2. The method of claim 1, including:
   providing a feedback signal to the first clocked domain to indicate at least one of transmission of said plurality of data units and availability of said second clocked domain for a next write cycle.

3. The method of claim 1, including:
   providing to said first clocked domain based on the enable signal, a first signal indicating arrival of said plurality of data units of data at the source location;
   in response to said first signal, initializing a data transfer of said plurality of data units to the target location in the second clocked domain;
   generating a second signal indicating synchronization of said enable signal with respect to said second clocked domain based on the initialization of data transfer;
   in response to said second signal, initiating the data transfer from said source location in the first clocked domain to said target location in the second clocked domain;
   generating a third signal indicating transmission of said plurality of data units for the first clocked domain based on the initiation of the data transfer; and
   in response to said third signal, indicating availability of said second clocked domain to said first clocked domain for a next write cycle.

4. The method of claim 3, further including generating said first signal in response to a transition from a first state to a second state in the state machine.

5. The method of claim 1, further including loading said plurality of data units into said intermediate register from said first register.

6. The method of claim 1, including providing a synchronizer to enable an asynchronous data transfer between the first and second clocked domains.

7. The method of claim 6, including implementing a protocol causing the transition between said first state and said second state in said state machine to drive said synchronizer.

8. The method of claim 7, including operating said state machine to:
   in response to said enable signal, transition from said first state including an initial state to said second state including a plurality of target states according to said protocol;
   in response to at least one condition being met, cause said synchronizer to combine synchronization of said plurality of data units for asynchronous data transfer across said first and second clocked domains; and
   in response to said at least one condition not being met, cause said synchronizer to hold transfer of said plurality of data units.

9. The method of claim 1 including handling switching of a clocking signal using a state machine while asynchronously transferring said plurality of data units between said first and second clocked domains.

10. An apparatus, comprising:
    a data path coupleable between a first and a second clocked domains;
    a control logic operably coupled to said data path to:
        receive a plurality of data units at a source location in a first clocked domain to be written to a target location in a second clocked domain, having a different clocking frequency than said first domain;
        detect at said first clocked domain, an enable signal to control writing of said plurality of data units from said source location to a target location in the second clocked domain;
        synchronize the enable signal with respect to the second clocked domain;
        in response to said synchronized enable signal, transfer said plurality of data units from the first clocked domain to the target location in said second clocked domain;
    a first register and an intermediate register being a shadow copy of the first register at the source location in said first clocked domain; and
    a second register at said target location in said second clocked domain.

11. The apparatus of claim 10, wherein said control logic to provide a feedback signal to the first clocked domain to indicate at least one of transmission of said plurality of data units and availability of said second clocked domain for the next write cycle.

12. The apparatus of claim 11, wherein said control logic to:
provide to said first clocked domain based on the enable signal, a first signal indicating arrival of said plurality of data units of data at the source location;
in response to said first signal, initialize a data transfer of said plurality of data units to the target location in the second clocked domain;
generate a second signal indicating synchronization of said enable signal with respect to said second clocked domain based on the initialization of data transfer;
in response to said second signal, initiate the data transfer from said source location in the first clocked domain to said target location in the second clocked domain;
generate a third signal indicating transmission of said plurality of data units for the first clocked domain based on the initiation of the data transfer; and
in response to said third signal, indicate availability of said second clocked domain to said first clocked domain for the next write cycle.

13. The apparatus of claim 11, further comprising a state machine to generate said first signal in response to a transition from a first state to a second state in said state machine.

14. The apparatus of claim 10, wherein said control logic loads said plurality of data units into said intermediate register from said first register.

15. The apparatus of claim 14, wherein said control logic handles switching of a clocking signal based on the state machine while asynchronously transferring said plurality of data units between said first and second clocked domains each domain including at least one independently clocked logic with respect to another clocked logic.

16. The apparatus of claim 15, further comprising a synchronizer to enable an asynchronous data transfer between the first and second clocked domains.

17. The apparatus of claim 16, further comprising a protocol causing the transition between said first state and said second state in said state machine to drive said synchronizer.

18. The apparatus of claim 17, wherein said protocol operates said state machine to:
in response to said enable signal, transition from said first state including an initial state to said second state including a plurality of target states according to said protocol;
in response to at least one condition being met, cause said synchronizer to combine synchronization of said plurality of data units for asynchronous data transfer across said first and second clocked domains; and
in response to said at least one condition not being met, cause said synchronizer to hold transfer of said plurality of data units.

19. An article comprising a medium storing instructions that enable a processor-based system to:
receive a plurality of data units at a source location in a first clocked domain to be written to a target location in a second clocked domain, having a different clocking frequency than said first domain;
detect at said first clocked domain, an enable signal to control writing of said plurality of data units from said source location to a target location in the second clocked domain;
synchronize the enable signal with respect to the second clocked domain;
in response to said synchronized enable signal, transfer said plurality of data units from the first clocked domain to the target location in said second clocked domain;
provide a first register and an intermediate register being a shadow copy of the first register at the source location in said first clocked domain; and
provide a second register at said target location in said second clocked domain.

20. The article of claim 19, further storing instructions that enable the processor-based system to:
provide a feedback signal to the first clocked domain to indicate at least one of transmission of said plurality of data units and availability of said second clocked domain for the next write cycle.

21. The article of claim 20, which further storing instructions that enable the processor-based system to generate said first signal in response to a transition from a first state to a second state in a state machine.

22. The article of claim 21, further storing instructions that enable the processor-based system to handle switching of a clocking signal based on the state machine while asynchronously transferring said plurality of data units between said first and second clocked domains each domain including at least one independently clocked logic with respect to another clocked logic.

23. The article of claim 22, further storing instructions that enable the processor-based system to provide a synchronizer to enable an asynchronous data transfer between the first and second clocked domains.

24. The article of claim 23, further storing instructions that enable the processor-based system to implement a protocol causing the transition between said first state and said second state in said state machine to drive said synchronizer.

25. The article of claim 24, further storing instructions that enable the processor-based system to operate said state machine to:
in response to said enable signal, transition from said first state that includes an initial state to said second state that includes a plurality of target states according to said protocol;
in response to at least one condition being met, cause said synchronizer to combine synchronization of said plurality of data units for asynchronous data transfer across said first and second clocked domains; and
in response to at least one condition not being met, cause said synchronizer to hold transfer of said plurality of data units.

26. The article of claim 19, further storing instructions that enable the processor-based system to:
provide to said first clocked domain based on the enable signal, a first signal to indicate the arrival of said plurality of data units of data at the source location;
in response to said first signal, initialize a data transfer of said plurality of data units to the target location in the second clocked domain;
generate a second signal to indicate synchronization of said enable signal with respect to said second clocked domain based on the initialization of data transfer;
in response to said second signal, initiate the data transfer from said source location in the first clocked domain to said target location in the second clocked domain;

generate a third signal to indicate transmission of said plurality of data units for the first clocked domain based on the initiation of the data transfer; and in response to said third signal, indicate availability of said second clocked domain to said first clocked domain for a next write cycle.

27. The article of claim 19, further storing instructions that enable the processor-based system to load said plurality of data units into said intermediate register from said first register.

* * * * *